(12) United States Patent
Honarpardaz

(10) Patent No.: US 11,954,406 B2
(45) Date of Patent: Apr. 9, 2024

(54) METHOD FOR GENERATING A TOOL INTERACTING WITH AN OBJECT

(71) Applicant: ABB Schweiz AG, Baden (CH)

(72) Inventor: Mohammadali Honarpardaz, Västerås (SE)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 17/281,831

(22) PCT Filed: Oct. 12, 2018

(86) PCT No.: PCT/EP2018/077937
§ 371 (c)(1),
(2) Date: Mar. 31, 2021

(87) PCT Pub. No.: WO2020/074104
PCT Pub. Date: Apr. 16, 2020

(65) Prior Publication Data
US 2021/0390218 A1    Dec. 16, 2021

(51) Int. Cl.
*G06F 30/17* (2020.01)
*G06F 30/10* (2020.01)
(Continued)

(52) U.S. Cl.
CPC .............. *G06F 30/10* (2020.01); *G06F 30/17* (2020.01); *B25J 15/08* (2013.01); *G06F 2111/06* (2020.01)

(58) Field of Classification Search
CPC ...... G06F 30/10; G06F 30/17; G06F 2111/06; B25J 15/08
See application file for complete search history.

(56) References Cited

U.S. PATENT DOCUMENTS 9,649,764 B1 * 5/2017 Sun ........................ B25J 13/025
10,275,543 B1 * 4/2019 Edsinger ................. G06F 30/17
(Continued)

FOREIGN PATENT DOCUMENTS

JP        6036662 B2 * 11/2016
WO    2014060605 A1    4/2014

OTHER PUBLICATIONS

Honarpardaz, M., et al. "Finger design automation for industrial robot grippers: A review" Robotics & Autonomous Systems, vol. 87, pp. 104-119 (2017) (Year: 2016).*

(Continued)

*Primary Examiner* — Jay Hann
(74) *Attorney, Agent, or Firm* — Whitmyer IP Group LLC

(57) ABSTRACT

A method for generating a tool designed to interact with an object includes obtaining a model of the object, the model including at least a geometry of the object. A criterion set including at least one criterion for the tool is determined, and a virtual tool fulfilling the criterion set is created. An attribute reflecting a simulated interaction between the model and the virtual tool is calculated to thereby obtain an attribute value. On the basis of the attribute value, a to-be-fabricated virtual tool is appointed, and a corresponding tool is fabricated. By means of the present method, the performances of candidate tools can be evaluated before the fabrication of the same. Based on the evaluation, it can be decided whether, and which one, of the candidate tools shall be fabricated.

14 Claims, 2 Drawing Sheets

(51) Int. Cl.
G06F 111/06 (2020.01)
B25J 15/08 (2006.01)

(56) References Cited

U.S. PATENT DOCUMENTS

| 10,744,654 | B2* | 8/2020 | Li | B25J 15/10 |
| 10,850,392 | B2* | 12/2020 | Hager | B25J 15/0009 |
| 11,185,986 | B2* | 11/2021 | Hang | B25J 15/08 |
| 2016/0082660 | A1* | 3/2016 | Schuster | G06F 30/00 700/98 |

OTHER PUBLICATIONS

Honarpardaz, M., et al. "Fast grasp tool design: From force to form closure" IEEE 13th Conf. on Automation Science and Engineering, CASE (Aug. 2017) available from <https://ieeexplore.ieee.org/abstract/document/8256199> (Year: 2017).*

Rakesh, V., et al. "Application of a modified Genetic Algorithm for enhancing grasp quality on 3D objects" IEEE Int'l Conf. on Robotics Automation Control & Embedded Systems, RACE (2015) available from <https://ieeexplore.ieee.org/abstract/document/7097278> (Year: 2015).*

Honarpardaz, M., et al. "Generic Automated Multi-function Finger Design" 2016 2nd Int'l Conf. on Mechanical Engineering & Automation Science; IOP Conf. Series: Materials Science & Engineering, vol. 157, doi: 10.1088/1757-899X/157/1/012015 (2016) (Year: 2016).*

Dictionary.com "Criterion" (accessed Feb. 17, 2023) available from <https://www.dictionary.com/browse/criterion> (Year: 2023).*

Daniel W. "difference Criterion vs Criterium" English Language & Usage Stack Exchange (2016) (Year: 2016).*

Qunming, Li, et al.; "The Similarity Design of Heavy Forging Robot Grippers"; Intelligent Robotics and Applications, Springer Berlin Heidelberg, Berlin, Heidelberg; Dec. 16, 2009; 10 Pages.

Wolniakowski, Adam, et al; "Task and Context Sensitive Optimization of Gripper Design Using Dynamic Grasp Simulation"; 2015 20th International Conference on Methods and Models in Automation and Robotics (MMAR), IEEE; Aug. 24, 2015.

Datta, Rituparna, et al.; "Analysis and Design Optimization of a Robotic Gripper Using Multiobjective Genetic Algorithm"; IEEE Transactions on Systems, Man, and Cybernetics: Systems IEEE, Piscataway, NJ, vol. 46, No. 1; Jan. 1, 2016; 11 Pages.

Wolniakowski, Adam, et al; "Task and Context Sensitive Optimization of Gripper Design Using Dynamic Grasp Simulation"; Journal of Intelligent and Robotic Systems, Kluwer, Dordrecht, NL, vol. 87, No. 1; Mar. 25, 2017; 28 Pages.

International Search Report and Written Opinion of the International Searching Authority; Application No. PCT/EP2018/077937; Completed: Jun. 3, 2019; dated Jun. 19, 2019; 14 Pages.

* cited by examiner

METHOD FOR GENERATING A TOOL INTERACTING WITH AN OBJECT

TECHNICAL FIELD

The present invention relates to generation of tools interacting with objects. Such tools can for example be fingers for robot grippers, the fingers being configured to grip components to be processed by a robot.

BACKGROUND

It is conventionally known to apply a manual design approach in the generation of fingers for robot grippers. Such manual design is to large extent based on trial and error, and consequently designing functional and efficient fingers may take several weeks even for highly skilled designers.

Attempts are made to automatize the generation of fingers customized for gripping specific objects. For example, WO2014060605A1 discloses a method of automatically generating a finger for gripping an arbitrary object on the basis of CAD data of the object and CAD data of a finger blank. The method basically amounts to deducing part of the volume of the object from the volume of the finger blank to arrive at a partial negative surface of the object on the resulting finger. The method of WO2014060605A1 many times results in bulky fingers with over-dimensioned contact areas and large footprint.

There therefore remains a desire to mitigate the problems experienced with the conventional methods of generating tools interacting with objects.

SUMMARY

One object of the invention is to provide an improved method for generating tools interacting with objects, the method being fast and resulting in improved tools.

A further object of the invention is to provide an improved method for generating fingers for robot grippers, the method requiring no or a minimum amount of manual interference and resulting in fingers with good performances in terms of grasp quality and geometry (small footprint).

These objects are achieved by the method and the device according to the invention.

The invention is based on the realization that the performances of candidate tools can be evaluated by creating virtual tools and calculating an appropriate attribute reflecting a simulated interaction between each of the virtual tools and a model of an object to be interacted with. Candidate tools can thereby be tested virtually before the fabrication of the same. Based on the evaluation it can be decided whether, and which one, of the candidate tools shall be fabricated.

According to a first aspect of the invention, there is provided a method for generating a tool interacting with at least one object. The method comprises the steps of: obtaining a model of the at least one object, the model comprising at least geometry of the at least one object; determining at least one criterion set, each criterion set comprising at least one criterion for the tool; and creating at least one virtual tool fulfilling the criterion set. The method further comprises the steps of: calculating at least one attribute to thereby obtain at least one attribute value reflecting a simulated interaction between the model and each of the at least one virtual tool; appointing, on the basis of the at least one attribute value, a to-be-fabricated virtual tool; and fabricating a tool corresponding to the to-be-fabricated virtual tool.

According to one embodiment of the invention, the criterion set is based on an analysis of the geometry.

According to one embodiment of the invention, the step of obtaining a model of the at least one object comprises the step of obtaining, in addition to the geometry, at least one quality of the at least one object comprising at least one of the following: density, weight, moment of inertia, stiffness, hardness, surface roughness, and friction coefficient.

According to one embodiment of the invention, the criterion set comprises at least one of the following criteria: a number of contact areas between the tool and the at least one object, a minimum individual contact area between the tool and the at least one object, a minimum total contact area between the tool and the at least one object, a minimum static friction coefficient between the tool and the at least one object, a minimum dynamic friction coefficient between the tool and the at least one object, and at least one shape of the tool configured to interact with a corresponding shape of the at least one object and to constrain the relative movement between the tool and the at least one object in at least four degrees of freedom, such as in five or six degrees of freedom.

According to one embodiment of the invention, the step of creating at least one virtual tool comprises creating a plurality of virtual tools fulfilling the criterion set, and the step of calculating at least one attribute comprises calculating the same attribute or attributes for the combination of the model and each of the plurality of virtual tools to evaluate the performance of each of the plurality of virtual tools.

According to one embodiment of the invention, the at least one attribute reflects simulated static and/or dynamic forces between the model and each of the at least one virtual tool.

According to one embodiment of the invention, the method further comprises the step of simulating movements of a system or systems comprising the model and each of the at least one virtual tool to obtain the simulated static and/or dynamic forces.

According to one embodiment of the invention, the at least one attribute is contact wrench.

According to one embodiment of the invention, the method comprises the step of applying an optimization algorithm on the at least one virtual tool.

According to one embodiment of the invention, the optimization algorithm comprises a genetic algorithm.

According to one embodiment of the invention, the step of determining at least one criterion set comprises determining a plurality of criterion sets, each criterion set comprising at least one criterion for the tool, the step of creating at least one virtual tool comprises creating a plurality of virtual tools, each criterion set being fulfilled by at least one virtual tool, and the step of calculating at least one attribute comprises calculating the same attribute or attributes for the combination of the model and each of the plurality of virtual tools to evaluate the performance of each of the plurality of virtual tools.

According to one embodiment of the invention, at least one, such as both, of the steps of determining at least one criterion set and creating at least one virtual tool fulfilling the criterion set is implemented by a computer algorithm.

According to one embodiment of the invention, the tool comprises a finger for a robot gripper.

According to a second aspect of the invention, there is provided a tool generating system comprising a tool fabricating machine, and a computer configured to execute the steps of: obtaining a model of at least one object, the model comprising at least geometry of the at least one object;

determining at least one criterion set, each criterion set comprising at least one criterion for the tool; and creating at least one virtual tool fulfilling the criterion set. The computer is further configured to execute the steps of: calculating at least one attribute to thereby obtain at least one attribute value reflecting a simulated interaction between the model and each of the at least one virtual tool; appointing, on the basis of the at least one attribute value, a to-be-fabricated virtual tool; and providing instructions to the tool fabricating machine to fabricate a tool corresponding to the to-be-fabricated virtual tool.

According to one embodiment of the invention, the tool fabricating machine is a rapid prototyping or instant manufacturing machine such as a 3D printer.

BRIEF DESCRIPTION OF THE DRAWINGS

The invention will be explained in greater detail with reference to the accompanying drawings, wherein.

DETAILED DESCRIPTION

Figure 1:
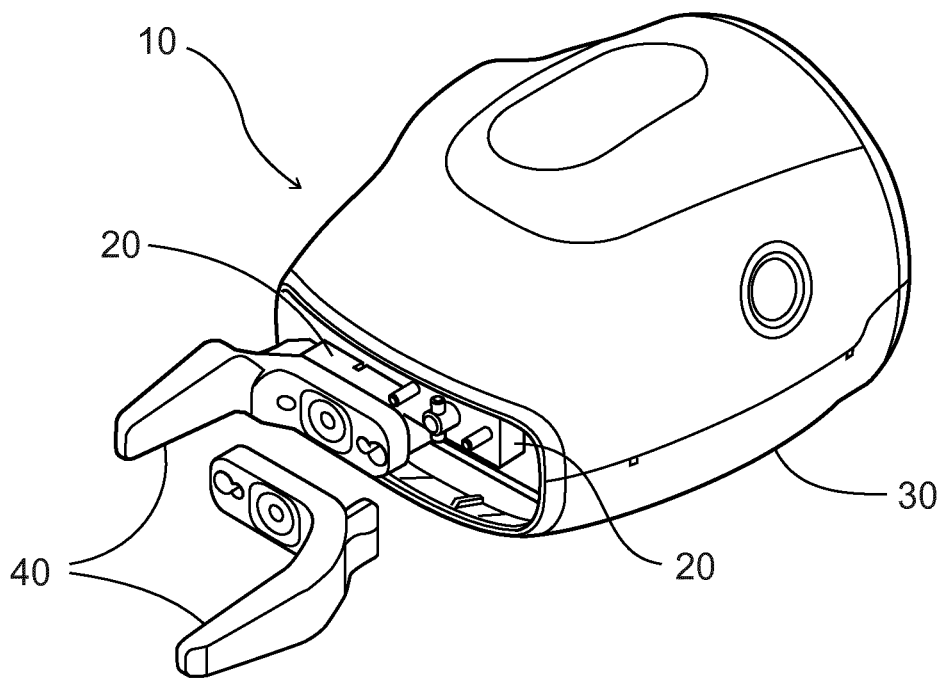
FIG. 1 shows a robot gripper with two fingers.

Referring to FIG. 1, a robot gripper 10 may comprise two finger interfaces 20 movable in relation to each other and in relation to a gripper housing 30. The finger interfaces 20 are configured to receive one finger 40 each. Fingers 40 of many different kinds can be used in one and the same robot gripper 10, and the fingers 40 can be changed to suit the object or objects 50, 60 (see FIG. 3) to be gripped. New fingers 40 suitable for new objects 50, 60 to be gripped can be generated at need. Many fingers 40 are general purpose fingers 40 in the sense that they are suitable for gripping objects 50, 60 of different kinds without being customized to grip objects 50, 60 of any particular kind. As the present invention relates to customized fingers 40, each of which is customized to grip objects 50, 60 of a particular kind, throughout this disclosure the term "finger" refers to a customized finger 40 if not differently specified. Fingers 40 that are customized to grip objects 50, 60 of two or more particular kinds are throughout this disclosure termed "multi-function fingers". Throughout this disclosure the term "object" refers both to one object 50, 60 to be gripped and to a plurality of objects 50, 60 to be gripped if not differently specified.

Figure 2:
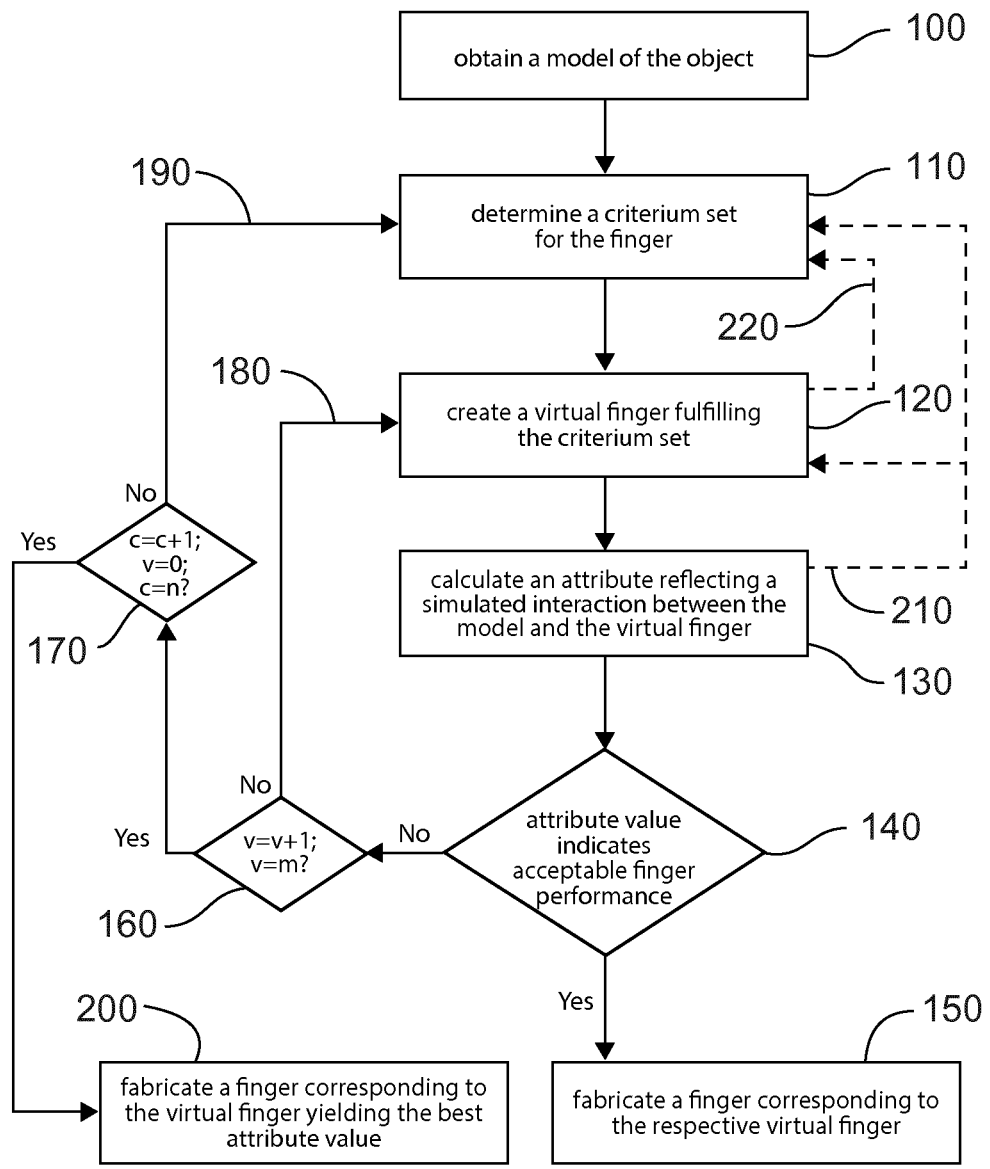
FIG. 2 shows a flow chart illustrating a method according to one embodiment of the invention.

Referring to FIG. 2, a method according to one embodiment of the invention begins with a first step 100 where a model 52 (see FIG. 3) of the object 50, 60 is obtained. In order to generate a finger 40 for a robot gripper 10, it is useful to have as much information about the object 50, 60 as possible. Crucial information is the geometry i.e., the size and shape of the object 50, 60, and therefore the model 52 shall comprise at least (part of the) geometry of the object 50, 60. It is to be understood that the model 52 does not need to comprise the complete geometry of the whole object 50, 60, but it can also comprise only the parts of the geometry essential for the generation of the finger 40. In addition to the geometry, the model 52 may comprise one or more additional qualities of the object 50, 60 relevant for the generation of a suitable finger 40, such as density, weight, moment of inertia, stiffness, hardness, surface roughness, friction coefficient, and, in case the object 50, 60 does not consist of one piece of homogenous material, one or more of the aforementioned qualities of sub-portions of the object 50, 60, and kinematic relations between the sub-portions.

At second step 110 a criterion set is determined, each criterion set comprising a criterion or criteria for the finger 40. The criterion set may be based on an analysis of the geometry, and it defines at least in part the type of grasp between the object 50, 60 and the finger 40 i.e. whether the object 50, 60 will be form closed, force closed, or both, and whether the finger 40 contacts an internal or external surface of the object 50, 60. The criterion set may e.g. comprise a shape of the finger 40 configured to interact with a corresponding shape of the object 50, 60, and to thereby constrain the relative movement between the finger 40 and the object 50, 60 in four, five or six degrees of freedom (the shape of a general purpose finger 40 typically constrains the relative movement between the finger 40 and an object 50, 60 in three or less degrees of freedom unless the general purpose finger 40 is configured to adapt to the shape of the object 50, 60).

Figure 3:
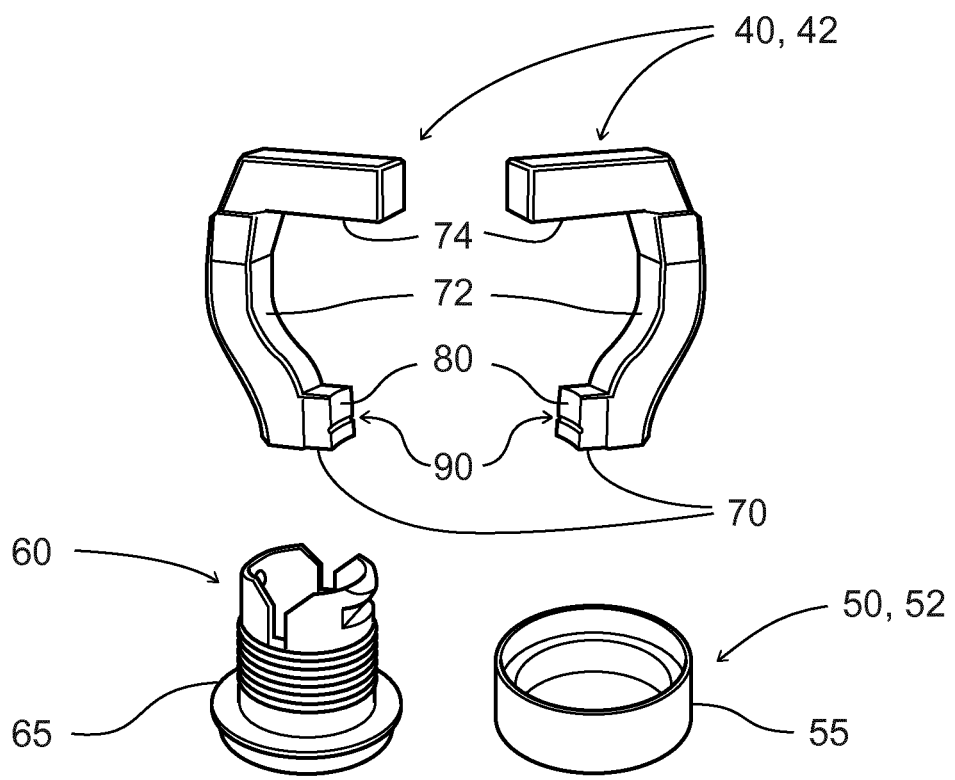
FIG. 3 shows two multi-function fingers or, alternatively, virtual fingers resulting from the method according to one embodiment of the invention together with two objects or, alternatively, models with what the fingers and virtual fingers, respectively, interact.

Referring to FIG. 3, a criterion may e.g., comprise a concave shape of the finger 40 corresponding to a convex shape of the object 50, 60. Each of the two multi-function fingers 40 has a fingertip 70 comprising a cap gripping area 80 consisting of a concave cylinder shape configured to mate with a cylindrical envelope 55 of a first object 50, in this case a lamp cap, and a base gripping area 90 consisting of a concave groove configured to mate with an annular collar 65 in a second object 60, in this case a lamp base. Each multi-function finger 40 thereby constrains the relative movement between the finger 40 and the first object 50 in four degrees of freedom by means of its shape (form closed about four degrees of freedom), the remaining two degrees of freedom (rotation about a first central axis and linear movement along the same) being constrained by friction between the finger 40 and the first object 50 (force closed about two degrees of freedom). Similarly, each multi-function finger 40 constrains the relative movement between the finger 40 and the second object 60 in five degrees of freedom by means of its shape, the remaining one degree of freedom (rotation about a second central axis) being constrained by friction between the finger 40 and the second object 60.

Instead of just one criterion, a plurality of criteria relevant for gripping the respective object 50, 60 may be determined for a finger 40. For example, the criterion set may comprise a number of contact areas between the finger 40 and the object 50, 60, a minimum individual contact area between the finger 40 and the object 50, 60, a minimum total contact area between the finger 40 and the object 50, 60, a minimum static friction coefficient between the finger 40 and the object 50, 60, and a minimum dynamic friction coefficient between the finger 40 and the object 50, 60. Preferably, the criterion set is determined by a computer algorithm based on an analysis of the geometry, but it can also be determined by the user, it can have a default value implying that the initial criterion set is always the same, or it can be determined randomly.

Referring again to FIG. 2, at third step 120 a virtual finger 42 fulfilling the criterion set is created. For example, if the criterion consists of a shape of a partial negative surface of the object 50, 60, the virtual finger 42 can be created by following the teaching of WO2014060605A1 i.e., by deducing part of the volume of the object 50, 60 from the volume of a fingertip blank. If the initial criterion set is always the same, the initial virtual finger 42 to be created can also be always the same. In such case the initial virtual finger 42 shall preferably be one that is expected to have a good performance in combination with objects 50, 60 of frequent occurrence. Preferably, however, the initial virtual finger 42 is created based on a more sophisticated analysis of the model 52, which analysis takes into account the sizes and accessibilities of different potential contact areas, point of gravity of the object 50, 60, required finger length, required gripper stroke, etc. Preferably, the virtual finger 42 is created by a computer algorithm based both on an analysis of the geometry and on the criterion set determined at the second step 110, but it can also be created by the user, it can have a default design implying that the initial virtual finger 42 is always the same, or it can be created randomly.

At fourth step 130 an attribute reflecting a simulated interaction between the model 52 and the virtual finger 42 is calculated, whereby an attribute value is obtained. The attribute value may reflect simulated static and/or dynamic forces between the model 52 and the virtual finger 42, and it can be used for evaluating the performance of the virtual finger 42. In order to obtain the simulated static and/or dynamic forces, movements of a system comprising the model 52 and the virtual finger 42 may be simulated. The attribute may for example be contact wrench. For calculation of contact wrenches reference is made to V.-D. Nguyen, Constructing Force-Closure Grasps in 3D, 1987 IEEE International Conference on Robotics and Automation, Pages 240-245.

At fifth step 140 it is evaluated whether the performance of the virtual finger 42 is acceptable e.g., by comparing the attribute value with a threshold value. If the performance of the virtual finger 42 is considered acceptable, the method moves on to a sixth step 150 where a finger 40 corresponding to the respective virtual finger 42 is fabricated. If, however, the performance of the virtual finger 42 at the fifth step 140 is not considered acceptable, the method according to the embodiment of FIG. 2 returns at least to the third step 120 to create another virtual finger 42. The method comprises namely a first counter 160 counting the number of created virtual fingers 42, v, fulfilling the respective criterion set determined at the second step 110, and a second counter 170 counting the number of different criterion sets, c. At the beginning of the method the first and second counters 160, 170 are reset to v=0 and c=0, respectively, and a first iteration cycle 180 is executed as long as either a virtual finger 42 is created the performance of whom is considered acceptable or m pieces of virtual fingers 42 fulfilling the respective criterion set are created, m being an integer of 1 or greater.

If after creating m pieces of virtual fingers 42 none of them is considered to show an acceptable performance, a second iteration cycle 190 is executed as long as either a virtual finger 42 is created the performance of whom is considered acceptable or n criterion sets are determined without arriving at a virtual finger 42 the performance of whom is considered acceptable. The second iteration cycle 190 resets the first counter 160 to v=0, which implies that the first iteration cycle 180 is executed, where necessary, such that m pieces of virtual fingers 42 fulfilling each respective criterion set are created between each consecutive execution of the second iteration cycle 190.

If after determining n different criterion sets no virtual finger 42 is considered to show an acceptable performance, the method moves on to a seventh step 200 where a finger 40 is fabricated. The seventh step 200 comprises the step of appointing, on the basis of the at least one attribute value, a to-be-fabricated virtual finger 42. Preferably the virtual finger 42 yielding the best attribute value is appointed, whereupon a finger 40 corresponding to the to-be-fabricated virtual finger 42 is fabricated. The sixth step 150 or, alternatively, the fifth step 140 can also be considered to comprise the step of appointing, on the basis of the at least one attribute value, a to-be-fabricated virtual finger 42, as the execution of the sixth step 150 is a direct result of the outcome of the evaluation at fifth step 140.

The method according to the embodiment of FIG. 2 therefore has two alternative last steps, the sixth and seventh steps 150, 200, both of which result in fabricating a finger 40 corresponding to one of the virtual fingers 42 (or corresponding to the virtual finger 42 in case only one virtual finger 42 is created) on the basis of the attribute value or values. The sixth step 150 is executed only in case a virtual finger 42 is created that is considered to show an acceptable performance, and the seventh step 200 is there only as a backup for the case that no virtual finger 42 showing an acceptable performance is created during a chosen (reasonable) number of iterations.

Which one of the two alternative last steps, the sixth or seventh step 150, 200, is executed depends on the outcome of the fourth and fifth steps 130, 140 evaluating the performance of the virtual finger 42, which in its turn depends on the outcome of the earlier second and third steps 110, 120 of determining a criterion set, and creating a virtual finger 42 fulfilling the same, respectively. Determining an appropriate criterion set is therefore a crucial step towards obtaining a satisfactory finger 40, and so is the creation of an appropriate virtual finger 42 on the basis of the available information. A default criterion set that is always the same, or a randomly chosen one, is not expected to be a particularly good starting point for the creation of the virtual finger 42. However, if the third step 120 of creating the virtual finger 42 is well implemented, a satisfactory finger 40 can be obtained with a small number of first iteration cycles 180 irrespective of the outcome of the second step 110. And vice versa; if the second step 110 of determining the criterion set is well implemented, a satisfactory finger 40 can be obtained with a small number of first iteration cycles 180 even with a less sophisticated implementation of the third step 120. The second and third steps 110, 120 therefore complement each other, and consequently can compensate for each other's weaknesses.

In order to improve the implementations of the first and second steps 100, 110, the outcome of the fourth step 130 can be used as a first feedback 210 for the first and/or second steps 100, 110 i.e., the outcome of the fourth step 130 (or the outcomes of many or all of the previous fourth steps 130) can be used as an input for determining the subsequent criterion set and/or for creating the subsequent virtual finger 42. Similarly, the outcome of the third step 120 can be used as a second feedback 220 for the first step 100 i.e., the outcome of the third step 120 (or the outcomes of many or all of the previous third steps 120) can be used as an input for determining the subsequent criterion set.

In its simplest form the first and second feedbacks 210, 220 may ensure that identical or almost identical criterion sets or virtual fingers 42 are not generated two times, which may somewhat reduce the number of first and second iteration cycles 180, 190 necessary for obtaining a satisfactory finger 40. In a more sophisticated form the first and second feedbacks 210, 220 may have a significant impact in obtaining a satisfactory finger 40 with a small number of first and second iteration cycles 180, 190. For example, the third step 120 may comprise the step of applying an optimization algorithm on the virtual fingers 42 created thus far. The optimization algorithm may rely on the respective attribute values.

The optimization algorithm may be a genetic algorithm that aims in obtaining a satisfactory finger 40 with a small number of first and second iteration cycles 180, 190 while limiting the computational burden of the process. A genetic algorithm consists of a population of potential solutions where a set of individuals are evolved during a number of generations based on successive selection, random crossover and mutation operations mimicking a Darwinian evolution process. The optimization starts with creating an initial population of e.g., ten virtual fingers 42, each of which fulfils the respective criterion set. An attribute reflecting a simulated interaction between the model 52 and each of the ten virtual fingers 42 is calculated to thereby obtain an attribute value for each of the ten virtual fingers 42. Then a new generation of e.g., ten virtual fingers 42 is created based e.g., on successive selection, where the individual virtual fingers 42 (i.e., parents) with the best attribute values are selected to create the next generation. Alternatively, or additionally, the next generation can be created by selecting random pairs of parents (random crossover) and/or by applying random changes to one or both of the parents (mutation).

Referring to the method according to the embodiment of FIG. 2, the genetic algorithm implies that instead of just one virtual finger 42, at the third step 120 a plurality of virtual fingers 42 during each execution of the first iteration cycle 180 may be created, and between two subsequent executions of the second iteration cycle 190 several generations of virtual fingers 42 may be created.

The fifth and sixth steps 140, 150 according to the method according to the embodiment of FIG. 2 are optional in that the number of iteration cycles may be constant instead of depending on the outcome of the evaluation at the fifth step 140.

Referring again to FIG. 3, each finger 40 comprises three main finger portions—a fingertip 70, a finger body 72 and a finger base 74. The fingertip 70 is the part configured to be in direct contact with the object 50, 60, the finger base 74 is configured to be attached to a finger interface 20 of a robot gripper 10, and the finger body 72 mechanically connects the fingertip 70 to the finger base 74 such as to enable the fingertip 70 to reach the desired contact area or contact areas of the object 50, 60. The different finger portions may all be integral parts of a finger 40 consisting of one piece of homogenous material, or all or some of them may be separate parts attached to each other by means of fastening elements such as screws, or by means of fastening medium such as glue.

Up to the two alternative last steps, the sixth or seventh steps 150, 200, the method according to the embodiment of FIG. 2 may only be concerned about the performance of the fingertip 70 as it is the only part of a finger 40 that needs to be modelled in order to calculate the attribute at the fourth step 130 (the stiffnesses of the finger body 72 and the finger base 74 can e.g., be assumed infinite). It may also be enough to model just the surface or surfaces in contact with the respective contact area or contact areas of the object 50, 60, supposed that the stiffness of the remainder of the fingertip 70 can be assumed infinite.

The finger bodies 72 and the finger bases 74 can of course always be the same, but this would strongly limit the utility of the present method. Instead of always providing the same finger bodies 72 and finger bases 74, each of the sixth and seventh steps 150, 200 may comprise the step of designing a customized finger body 72 and a customized finger base 74, such that a complete customized finger 40 can be fabricated. A finger body 72 can be designed on the bases of the grasp type (i.e., internal or external), required offsets in different directions, and material properties of the finger 40. All these parameters may be made accessible to the user after the finger design for the case some modifications are required.

Next, an appropriate finger base 74 configured to be attached to the respective finger interface 20 of a robot gripper 10 is designed. Preferably, the gripper type is known, or it may be determined at this stage. Specifications of a gripper type affecting the finger design are e.g., number of fingers 40, payload, maximum finger length, gripper stroke and maximum actuating force. If there are several different gripper types available, an appropriate gripper type may be selected at the beginning of the method depending e.g., on the size and weight of the object 50, 60. Alternatively, the method can be executed such as to reflect all potentially feasible gripper types. For example, if both a two-finger gripper and a three-finger gripper are available, the criterion set for each finger 40 may look very different for the two alternatives, and so may the resulting fingers 40. That is, the method may arrive at very different results each of which is acceptable for the given gripper type.

If the method is executed to reflect several different gripper types, the method shall naturally comprise a step of indicating to which gripper type the resulting fingers 40 fit. In case of doubt the method shall also comprise a step of indicating which finger 40 fits to which finger interface 20 of the respective gripper type, which situation occurs in the frequent case that not all the fingers 40 are identical. All the fingers 40 may be identical, all of them may be different, and in case of more than two fingers 40 some of them may be identical while others are different.

After all the finger portions (i.e., fingertips 70, finger bodies 72 and finger bases 74) are designed, feasibility of the finger design is verified by checking for unwanted collisions between the respective model 52 and the respective virtual finger 42. If the virtual finger 42 is collision-free and accepted by the user, a CAD data of the virtual finger 42 is exported for fabrication of the corresponding finger 40 e.g., in a 3D printer or in another type of rapid prototyping or instant manufacturing machine.

The method shall naturally comprise all the respective steps disclosed herein in the context of generating a single finger 40 for generating all fingers 40 interacting in a respective gripper type.

Finally, the method may comprise the step of experimentally verify the function and collaboration of the fabricated fingers 40. This step begins with mounting the fabricated fingers 40 on the robot gripper 10. In order to verify the stability of the fingers 40, force and torque experiments are conducted to determine the maximum disturbance forces and torques that the fingers 40 can resist in X, Y and Z directions. Furthermore, a practical performance is verified in pick-and-place and/or assembly experiments. The design process terminates if the fingers 40 satisfy the expected performance. Otherwise, the herein disclosed method can be repeated fully or in part until the fingers 40 satisfy the expected performance.

The first, second, third, fourth and fifth steps 100, 110, 120, 130, 140, as well as the first and second counters 160, 170 and the first and second feedbacks 210, 220, of the method according to the embodiment of FIG. 2 can be executed by a general purpose computer running an appropriate software, while the sixth or the seventh step 150, 200, i.e. the actual fabrication of the finger 40, is executed by an appropriate finger fabricating machine.

However, the execution of the sixth and seventh steps 150, 200 can be controlled by the same computer executing other steps of the method. For example, a finger fabricating machine such as a 3D printer can be connected to the computer to receive control commands required for fabricating the finger 40.

The invention is not limited to the embodiments shown above, but the person skilled in the art may modify them in a plurality of ways within the scope of the invention as defined by the claims. Particularly, although the invention is disclosed with a reference to fingers 40 for a robot gripper 10, it can be applied to generation of various other tools.

The invention claimed is:

1. A method for generating a tool designed to interact with at least two objects, wherein the tool comprises a finger for a robot gripper, the method comprising the steps of:
    obtaining a model of each object, each model including at least a geometry of the respective object;
    determining, for each model, at least one requirement set specific to the respective object based on an analysis of the geometry of the respective object, each requirement set including at least one requirement for the tool, the at least one requirement specifying at least one of the following: a number of contact areas between the tool and each object, a minimum individual contact area between the tool and each object, a minimum total contact area between the tool and each object, a minimum static friction coefficient between the tool and each object, and a minimum dynamic friction coefficient between the tool and each object; and
    creating at least one virtual tool based on the at least one requirement;
    simulating an interaction between each model and each of the at least one virtual tool, which is created based on the at least one requirement;
    calculating attribute values of at least one predetermined attribute reflecting simulated static and/or dynamic forces between each model and each virtual tool;
    appointing, on the basis of the attribute values, a to-be-fabricated virtual tool; and
    fabricating a tool corresponding to the to-be-fabricated virtual tool.

2. The method according to claim 1, wherein the step of obtaining a model of each object includes the step of obtaining, in addition to the geometry, at least one quality of each object including at least one of the following: density, weight, moment of inertia, stiffness, hardness, surface roughness, and friction coefficient.

3. The method according to claim 1, wherein the step of creating at least one virtual tool includes creating a plurality of virtual tools based on the at least one requirement, and the step of calculating at least one attribute comprises calculating the same attribute or attributes for the combination of each model and each virtual tool to evaluate a performance of each virtual tool.

4. The method according to claim 3, wherein the step of obtaining a model of each one object includes the step of obtaining, in addition to the geometry, at least one quality of each object including at least one of the following: density, weight, moment of inertia, stiffness, hardness, surface roughness, and friction coefficient.

5. The method according to claim 1, wherein the step of simulating an interaction comprises simulating movements of a system or systems including each model and each virtual tool to obtain the simulated static and/or dynamic forces.

6. The method according to claim 5, wherein the step of creating at least one virtual tool includes creating a plurality of virtual tools based on the at least one requirement, and the step of calculating at least one attribute comprises calculating the same attribute or attributes for the combination of model and each virtual tool to evaluate a performance of each virtual tool.

7. The method according to claim 1, wherein the at least one attribute is contact wrench.

8. The method according to claim 1, wherein the method comprises the step of applying an optimization algorithm on each virtual tool.

9. The method according to claim 8, wherein the optimization algorithm comprises a genetic algorithm.

10. The method according to claim 1, wherein the step of determining at least one requirement set includes determining a plurality of requirement sets, wherein each requirement set includes at least one requirement for the tool,
    wherein the step of creating at least one virtual tool includes creating a plurality of virtual tools, wherein each requirement set is fulfilled by at least one virtual tool of the plurality of virtual tools, and
    wherein the step of calculating attribute values of at least one predetermined attribute includes calculating the same attribute or attributes for the combination of the model and each virtual tool to evaluate a performance of each virtual tool.

11. The method according to claim 1, wherein at least one of the steps of determining at least one requirement set and creating at least one virtual tool is implemented by a computer algorithm.

12. The method according to claim 1, wherein the finger is a multi-function finger.

13. A system for generating a tool designed to interact with at least two objects, wherein the tool comprises a finger for a robot gripper, the system comprising:
    a tool fabricating machine, and
    a computer configured to execute the steps of:
    obtaining a model of each object, each model including at least a geometry of the respective object,
    determining, for each model, at least one requirement set specific to the one respective object based on an analysis of the geometry of the respective object, each requirement set including at least one requirement for the tool, the at least one requirement specifying at least one of the following: a number of contact areas between the tool and each object, a minimum individual contact area between the tool and each object, a minimum total contact area between the tool and each object, a minimum static friction coefficient between the tool and each object, and a minimum dynamic friction coefficient between the tool and each object; and
    creating at least one virtual tool based on the at least one requirement;
    simulating an interaction between each model and each of the at least one virtual tool, which is created based on the at least one requirement;
    calculating attribute values of at least one predetermined attribute reflecting simulated static and/or dynamic forces between each model and each virtual tool;
    appointing, on the basis of the attribute values, a to-be-fabricated virtual tool; and providing instructions to the tool fabricating machine to fabricate a tool corresponding to the to-be-fabricated virtual tool.

14. The system according to claim 13, wherein the tool fabricating machine is a rapid prototyping or instant manufacturing machine.

* * * * *